United States Patent [19]

Uchida

[11] Patent Number: 4,993,474
[45] Date of Patent: Feb. 19, 1991

[54] DIE CASTING APPARATUS

[75] Inventor: Masashi Uchida, Ube, Japan

[73] Assignee: Ube Industries, Ltd., Ube, Japan

[21] Appl. No.: 265,371

[22] Filed: Oct. 28, 1988

[30] Foreign Application Priority Data

Nov. 10, 1987 [JP] Japan ................................. 62-170658
Nov. 11, 1987 [JP] Japan ................................. 62-283122

[51] Int. Cl.⁵ ............................................... B22D 5/02
[52] U.S. Cl. .................................... 164/326; 164/342; 164/343; 164/344
[58] Field of Search ............... 164/341, 342, 343, 322, 164/323, 324, 325, 326, 327, 328; 425/575, 576, 589

[56] References Cited

U.S. PATENT DOCUMENTS 4,754,801  7/1988  Ueno et al. ........................... 164/342

FOREIGN PATENT DOCUMENTS

58-9725    1/1983  Japan .
58-65560   4/1983  Japan ................................. 164/342
58-100964  6/1983  Japan ................................. 164/343
61-195766  8/1986  Japan .

Primary Examiner—Richard K. Seidel
Attorney, Agent, or Firm—Rosenblum, Parish & Bacigalupi

[57] ABSTRACT

In a die casting apparatus, mold opening/closing units are mounted on carriers and the carriers are freely moved in/out from a mold clamping unit in a lateral direction. The mold clamping unit includes at least two guides for guiding each of the carriers from a standby position to a predetermined position in the mold clamping unit and a stationary board having a higher portion formed at a portion sandwiched by the guides. Each of the carriers includes a lift unit for moving upward/-downward the mold opening/closing unit. When each of the carriers is to be moved, the lift unit positions the mold opening/closing unit at a height at which the mold opening/closing unit can freely move without colliding against the higher portion, moves the mold opening/closing unit into the mold clamping unit, and then moves downward and places the mold opening/-closing unit on the higher portion of the stationary board.

10 Claims, 9 Drawing Sheets

DIE CASTING APPARATUS

BACKGROUND OF THE INVENTION

The present invention relates generally to die casting and more specifically to an apparatus in which a mold opening/closing unit is mounted on a carrier and is freely moved in/out from a mold clamping unit.

In a conventional die casting apparatus, a pair of metal molds are clamped by a mold clamping unit to perform casting. However, recently, in order to reduce the duration of a casting cycle, a continuous die casting apparatus has been developed in which a plurality of mold opening/closing units, each comprising metal molds and a temporary mold clamping mechanism, are sequentially moved in/out from a main mold clamping-/casting unit, for casting after clamping. In an example apparatus of this type, mold opening/closing units are moved into and out of a mold clamping unit alternately from both the right and left sides thereof as disclosed in Japanese Utility Model Laid-Open (Kokai) No. 58-9725. In an example rotary die casting machine, a plurality of mold opening/closing units are moved in respective holding portions formed on a rotary table which rotates so that the mold opening/closing units are sequentially positioned at a mold clamping station to perform mold clamping and casting as disclosed in Japanese Patent Laid-Open (Kokai) No. 61-195766 also filed by the present applicant.

The former apparatus, in which the mold opening/closing units are moved into and out of the mold clamping unit alternately from the right and left sides thereof, includes a long carrier extending from a mold clamping position to one mold opening/closing position and two mold opening/closing units mounted on the long carrier. The carrier is reciprocated rightward and leftward so that when one mold opening/closing unit is located at the mold clamping position, the other mold opening/closing unit is located at an external mold opening/closing position. As a result, while casting is being performed to one mold opening/closing unit, the other mold opening/closing unit is being prepared.

In the latter rotary die casting machine, the mold opening/closing units are located on rollers of a metal mold setting unit and sequentially moved onto rollers of the holding portions on the rotary table. Each mold opening/closing unit is floated from the corresponding roller by a cylinder provided at the holding portion for temporarily clamping the molds. Then, the rotary table is rotated to move each mold opening/closing unit to the mold clamping/casting position for performance of final mold clamping and casting.

Of the above conventional die casting apparatuses, in the former apparatus in which the mold opening/closing units are moved in the mold clamping unit alternately from both the right and left sides thereof, two mold opening/closing units are mounted on a single carrier. Therefore, if one of the mold opening/closing units malfunctions and needs repair, the carrier cannot be moved until repair is completed, meanwhile interrupting production of the other mold opening/closing unit.

In the latter rotary die casting machine, each mold Opening/closing unit is directly moved onto the roller of the corresponding holding portion without a carrier. Therefore, a cylinder for floating the mold opening/closing units must be provided at each holding portion, complicating the structure.

SUMMARY OF THE INVENTION

It is, therefore, a principal object of the present invention to provide a die casting apparatus with a simple mounting structure for a mold opening and closing unit.

It is another object of the present invention to provide a die casting apparatus with an easily repairable mold opening/closing unit.

It is still another object of the present invention to provide a die casting apparatus using a plurality of mold opening/closing units, and able to operate continuously even despite a malfunction in one of the mold opening/closing units, thereby improving productivity as compared with that of a conventional apparatus.

In order to achieve the above objects, the present invention provides a die casting apparatus in which mold opening/closing units are mounted on carriers and the carriers are freely movable laterally into and out of a mold clamping unit. The mold clamping unit comprises at least two guides for guiding each of the carriers from a standby position to a predetermined position in the mold clamping unit, and also comprises a stationary board having a higher portion sandwiched by the guides. The carriers each comprise a lift unit for raising and lowering the mold opening/closing unit. When each of the carriers is to be moved, the lift unit positions the mold opening/closing unit to a height where the mold opening/closing unit can move freely without colliding against the higher portion. The lift unit next moves with the mold opening/closing unit into the mold clamping unit, and then lowers the mold opening/closing unit onto the higher portion of the stationary board.

DETAILED DESCRIPTION OF THE PREFERRED EMBODIMENTS

An embodiment of a die casting apparatus according to the present invention applied to a rotary die casting machine will be described below. Referring to FIGS. 1 through 4, a rotary die casting machine 1 comprises first, second, and third stations 2, 3, and 4, the central axes of which form angles of 120 degrees to each other. First station 2 includes a base platen 5, formed by a table support portion 5a having a disk-like planar shape and formed integrally with an injection portion 5b having a planar shape of an isosceles triangle, and fixed to a foundation on a floor surface. One tie bar 6 and two tie bars 7 are fixed by nuts at three portions, i.e., bar 6 at a central portion of the table support portion 5a and bars 7 at ends of the base of the isosceles triangle of the injection portion 5b, and extend therefrom. Cylinder platen 8 through-holes in an isosceles triangle layout fit over upper end portions of the tie bars 6 and 7, which are tightly fixed by nuts 9. The first station 2 has a mold clamping unit 10, an injection unit 11, and an automatic molten metal supply unit (not shown). These units will be described later in an order.

Figure 1:
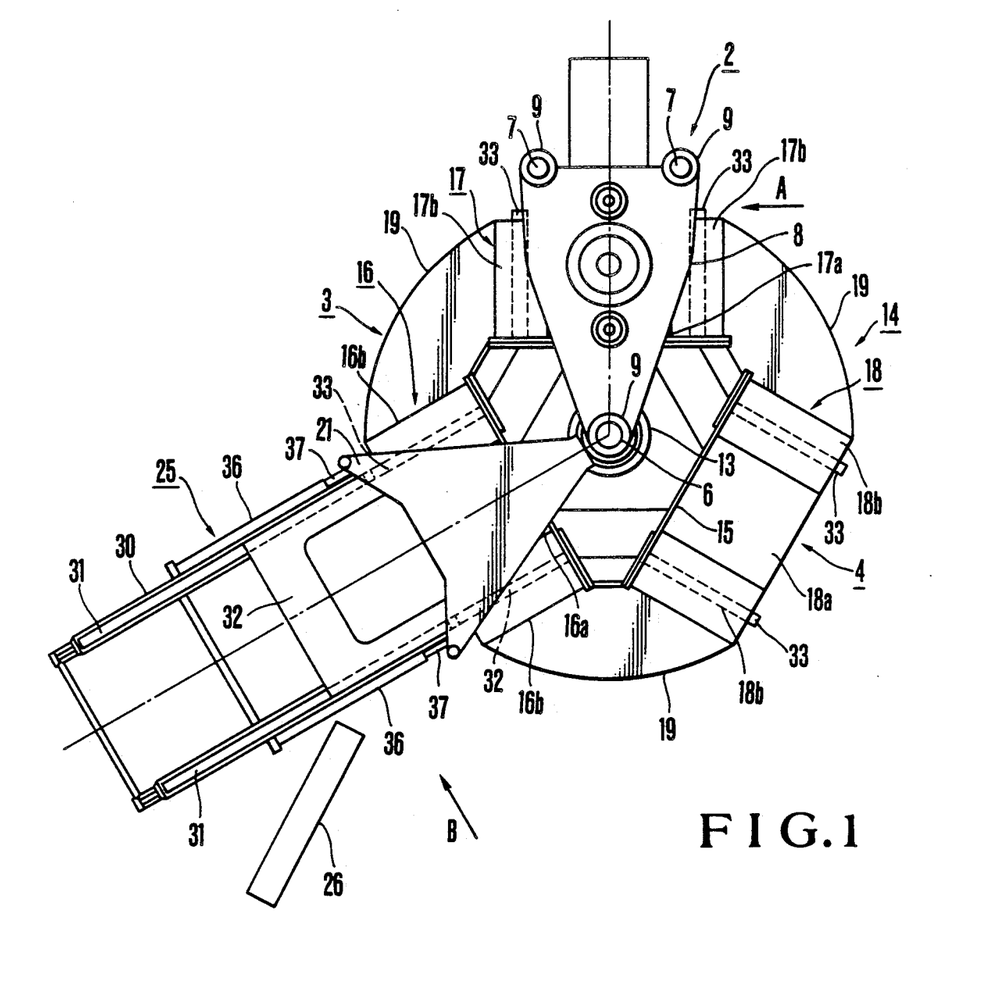
FIG. 1 is a schematic plan view of an embodiment of a rotary die casting apparatus according to the present invention.
Figure 2:
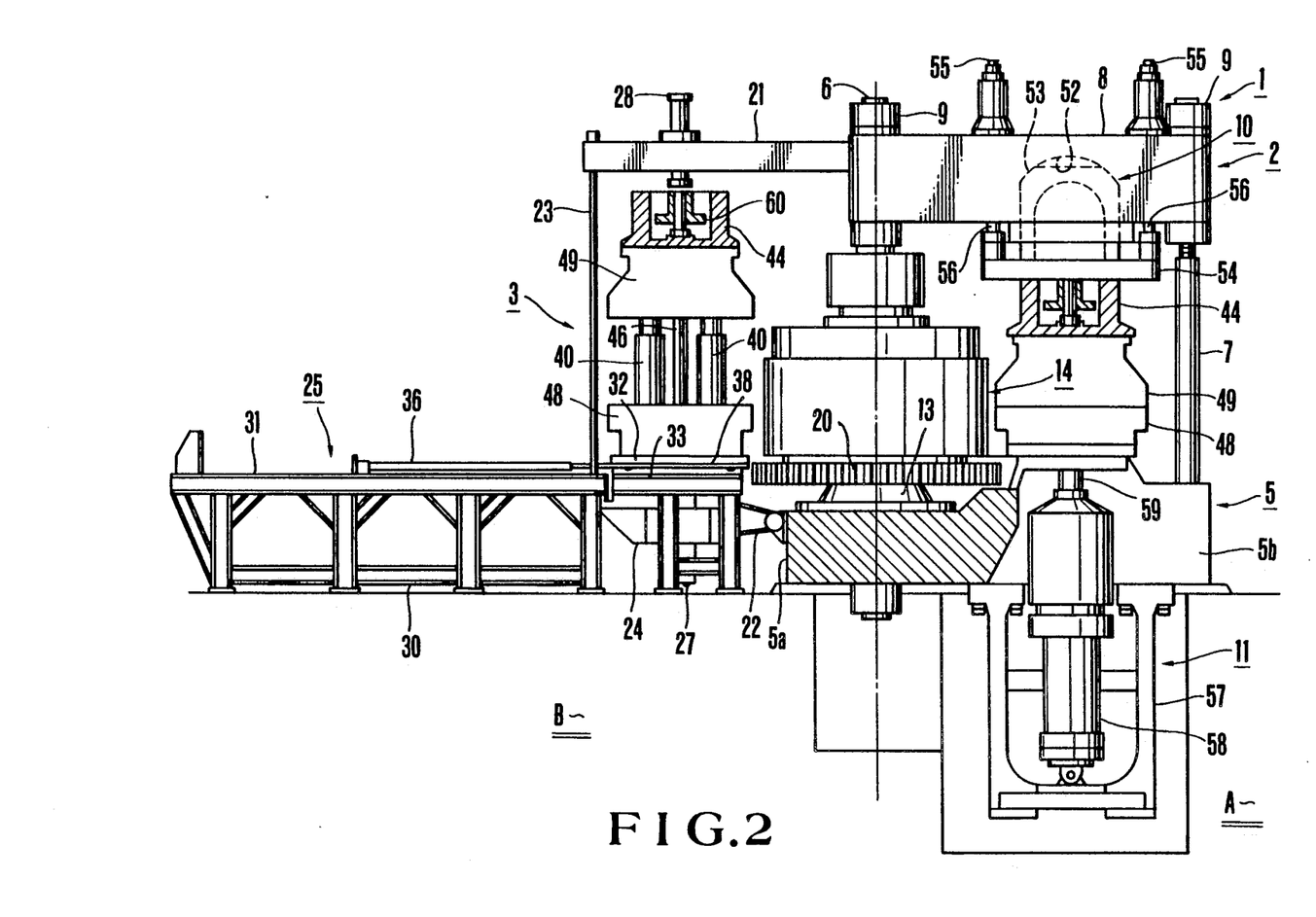
FIG. 2 is a developed front view in which the right half is seen from the angle of an arrow A in FIG. 1 and the left half is seen from the angle of an arrow B in FIG. 1.

An inverted funnel-like hollow shaft 13 for rotating a table, which incorporates tie bar 6 and extends upright concentrically therewith, is fixed onto the upper surface of table support portion 5a. A rotary table 14 is rotatably supported by hollow shaft 13 through upper and lower ball bearings. Rotary table 14 is integrally formed by a boxlike central frame 15 shaped like a planar equilateral triangle and is fitted on the ball bearings. The three stationary boards 16, 17, and 18 are positioned at sides of the triangle. Support plates 19 occupy sectors between stationary boards 16, 17, and 18. The stationary boards 16, 17, and 18 are rectangular and planar with higher central portions 16a, 17a, and 18a on both sides of which are formed lower portions 16b, 17b, and 18b. Hence, the boards have a projecting sectional shape. Gear 20 meshes with a pinion (not shown) connected directly to a motor at the base platen 5 side. The gear 20 is fixed to the rotary table 14 such that rotary table 14 is intermittently rotated ⅓ of a revolution at a predetermined timing in accordance with rotation of the motor driven by a command from a controller.

Second station 3 includes an extrusion frame 21, shaped like a planar isosceles triangle, and fixed by cylinder platen 8 to extend horizontally. Station 3 also includes a projecting frame 24 extending horizontally fixed through a bracket 22 to the table support portion 5a and connected through a pair of tie bars 23 to extrusion frame 21.

Second station 3 has a metal mold setting unit 25, a product extracting unit 26 described below, a projecting cylinder 27, and an extrusion cylinder 28. When a casting operation is to be started, metal molds are to be changed, or maintenance is to be performed, the metal mold setting unit 25 supplies a mold opening/closing unit 29 to stationary boards 16, 17, and 18 of the rotary table 14, or else extracts a mold opening/closing unit 29 therefrom. The second station 3 includes a frame 30 extending radially from stationary boards 16, 17 and 18 (henceforth generally represented by numeral 16 unless a board needs to be described independently) and fixed onto the floor. Two guide rails 31 are installed on the frame 30.

Figure 3:
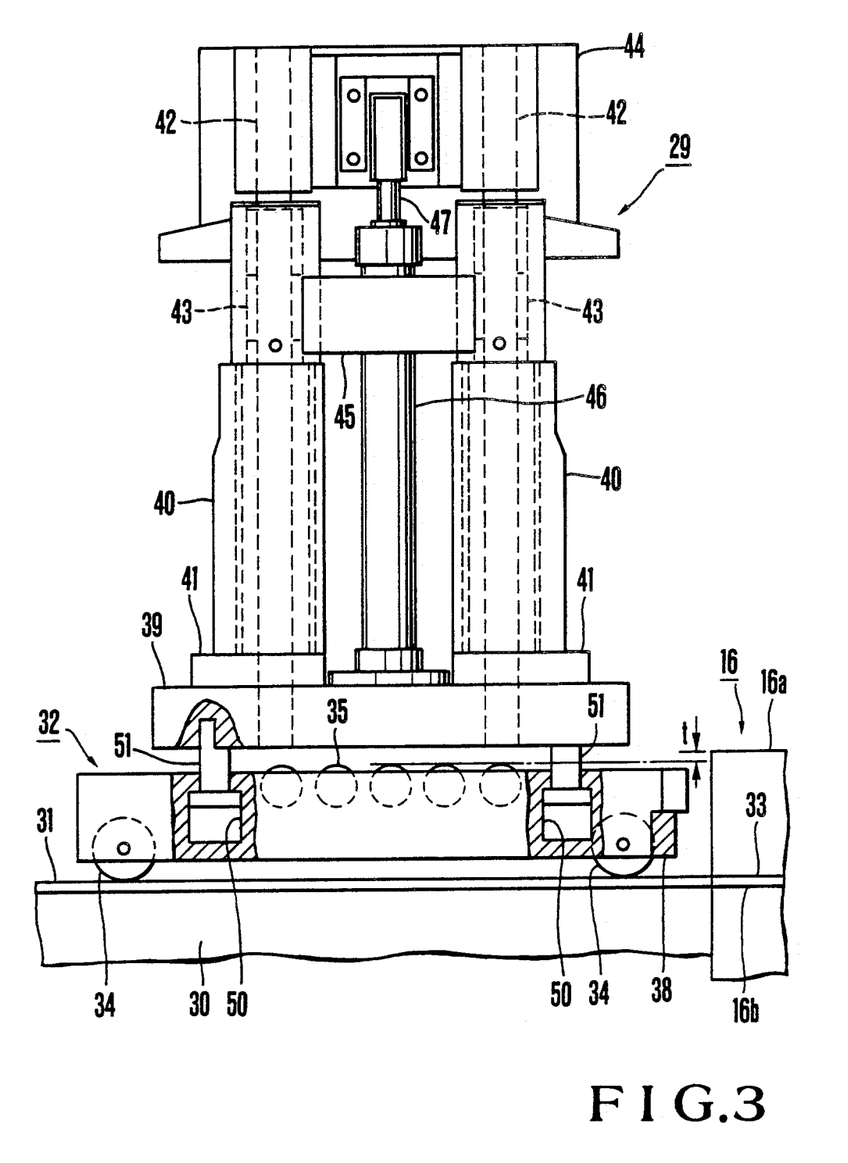
FIG. 3 is a partially cutaway front view of a mold opening/closing unit, a carrier, and part of a stationary board.
Figure 4:
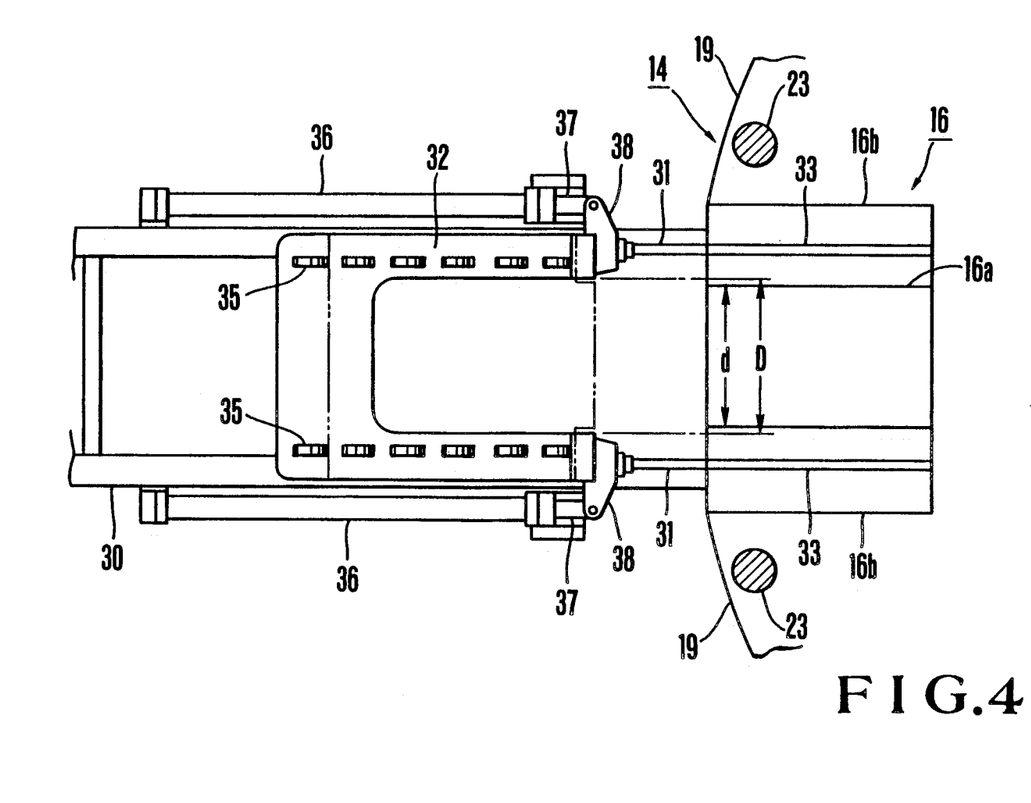
FIG. 4 is a plan view of the carrier and part of the stationary board.
Figure 5:
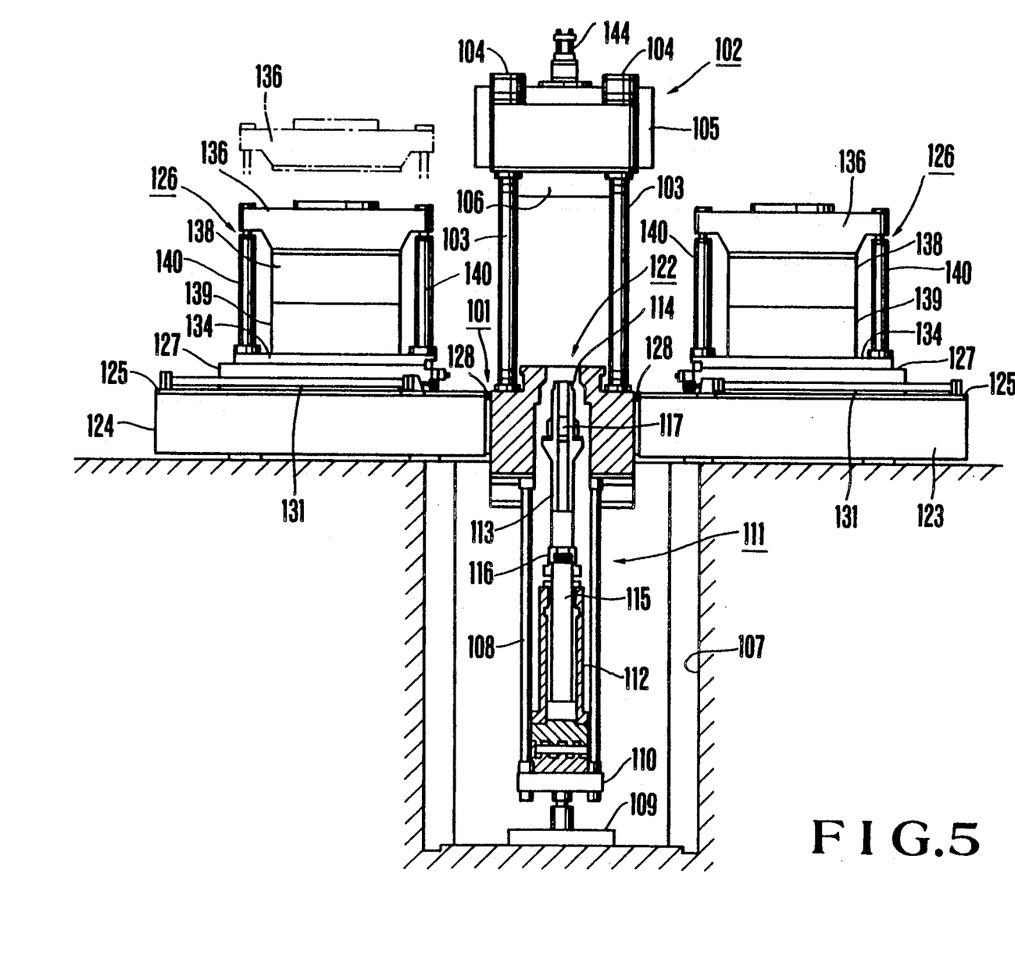
FIG. 5 is a schematic front view showing another embodiment of the die casting apparatus according to the present invention.

Mold opening/closing carrier unit 29 and a unit for moving the mold opening/closing unit 29 in and out from stationary board 16 are described below. Carrier 32 has four wheels 34 rolling between rails (or tracks) 31 and rails (or tracks) 33 on stationary board 16. The carrier 32 includes an opening opposite from stationary board 16 and therefore has a planar C or U shape. In FIG. 4 the opening width D is slightly larger than opening d of the higher central portion 16a. Two rows of multiple rollers 35 are rotatably arranged on the carrier 32. The tops of rollers 35 over the surface of carrier 32 are formed a distance t lower than the top of higher central portion 16a in FIG. 3. A pair of carrier-moving cylinders 36 are supported along both sides of frame 30. Actuation ends of piston rods 37 of cylinders 36 are connected to metal pieces 38 on both sides of a radially inner end of carrier 32. When piston rods 37 are moved forward/backward by, e.g., air pressure, carrier 32 moves forward/backward between a position at which the carrier 32 moves onto the lower portions 16b to surround the higher central portion 16a of the stationary board 16 from three directions, and an alternate position at which the carrier 32 moves onto the frame 30 as an external portion in a lateral direction of the stationary board 16.

The mold opening/closing unit 29 mounted on the carrier 32 has at its lower end portion a rectangular mounting base 39. Square cylindrical brackets 40 extend vertically from bases 41 bolted to four corners of mounting base 39. A guide rod 42 moves freely vertically through a bushing 43 supported in an inner hole of each bracket 40. A rectangular planar top frame 44 is fixed to upper projecting portions of, and moves vertically with, guide rods 42. The two front brackets 40 are connected through connecting plates 45 to the two rear brackets 40 for reinforcement. A pair of right and left mold opening/closing cylinders 46 lifting top frame 44 together with guide rods 42 extend up from lower ends fixed to mounting base 39. Actuation ends of piston rods 47 of cylinders 46 are connected to opposite side surfaces of top frame 44. A stationary metal mold 48 and a movable metal mold 49 are fixed to mounting base 39 and to top frame 44 respectively. When top frame 44 moves up and down, movable metal mold 49 opens and closes with respect to stationary metal mold 48. In addition, when top frame 44 is moved slightly downward after the metal molds are closed, a minimum necessary mold clamping force is applied.

Figure 8:
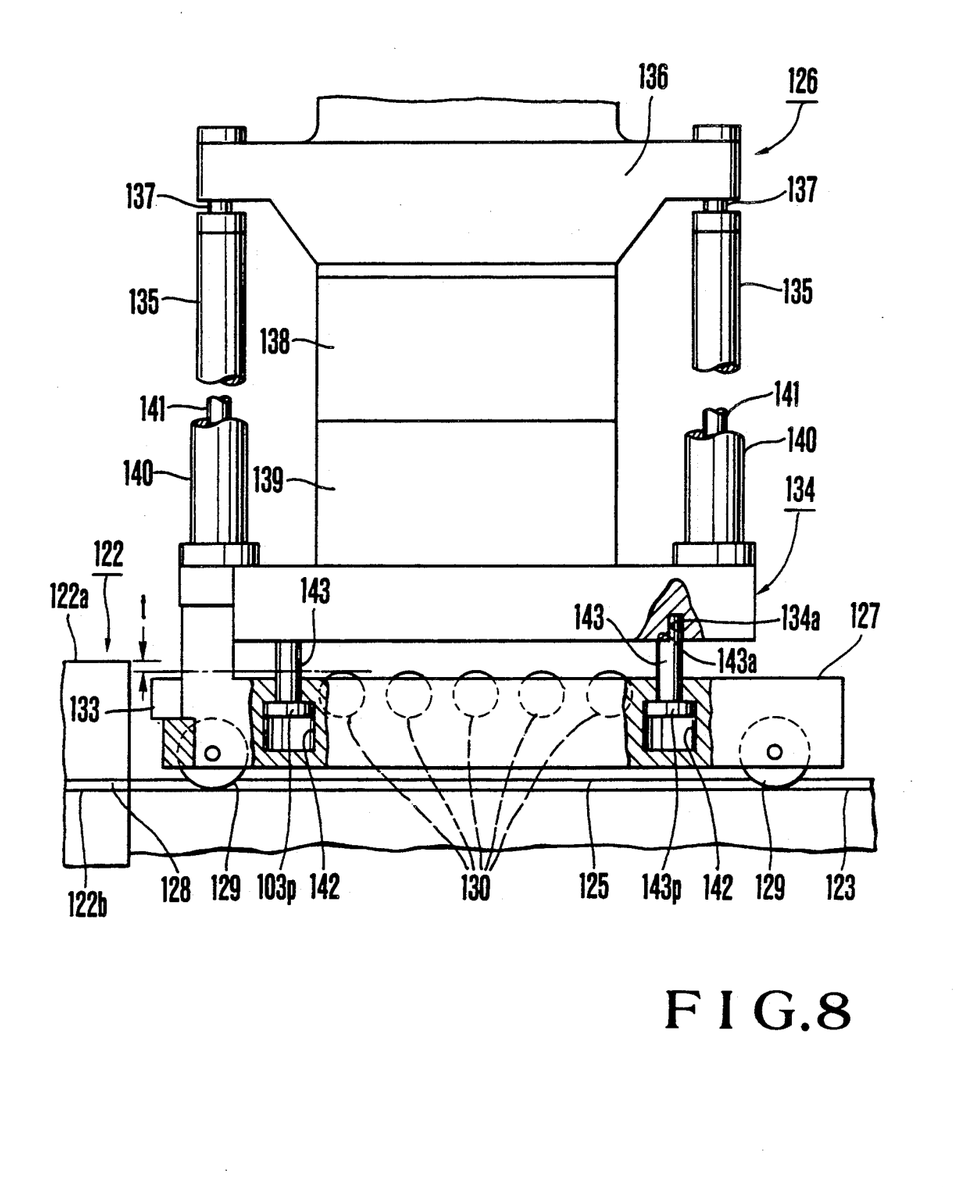
FIG. 8 is a front view of a mold opening/closing unit, a carrier, and part of a stationary board.

The mold opening/closing unit 29 is supported by pistons 143P (FIG. 8) in carrier 32. Cylinders 50 (FIG. 3) are fixed to the four front, rear, right and left portions of carrier 32. Piston rods 51, which move upward/downward together with the pistons 143P by, e.g., an air pressure, have semicircular split upper ends projecting into pin holes in mounting base 39 and thereby positioning mold opening/closing unit 29. The upper half-ends support and define the vertical position of mold opening/closing unit 29. Piston rods 51 move upward/downward, the mounting base 39 moves upward/downward so that its lower surface moves between positions higher and lower than the upper surface of the stationary board higher central portion 16a. At the lower surface's higher position, the mounting base 39 moves freely onto stationary board 16 without contacting the upper surface of higher central portion 16a. At the lower position, it is seated on lower portions 16b. When piston rods 51 are moved further downward while the carrier 32 is located on the mold setting unit 25, mounting base 39 is seated on rollers 35. Thereafter, by moving mounting base 39 along rollers 35, mold opening/closing unit 29 can easily be removed from carrier 32 for maintenance or the like.

As described above, after metal molds 48 and 49 are temporarily clamped on the stationary board 16, mold opening/closing unit 29 is moved, by pivoting motion of the rotary table 14, to first station 2 for mold clamping and casting. The mold clamping unit 10 includes a ram 53 fitted into a hole 52 in cylinder platen 8. Lower ends of ram 53 are attached to a moving platen 54, and piston rods 56 of a pair of pull-back cylinders 55 are mounted on the upper surface of the cylinder platen 8 and also attached to moving platen 54. With this arrangement, when oil is injected to an upper portion of the ram 53, the temporarily clamped mold opening/closing unit 29 top plate 44 is pushed downward to perform final mold clamping. When oil is discharged from the upper portion of the ram 53, mold clamping is released by pull-back cylinders 55.

The injection unit 11 for casting a molten metal into a cavity formed between the clamped metal molds 48 and 49 includes an injection cylinder 58 supported by a tie bar 57 extending downward from base platen 5. An injection cylinder 58 piston rod is connected to a plunger fitting into an inner hole of an injection sleeve 59 to be freely moved forward/backward therein. After the injection sleeve 59 supplied with a molten metal is connected to the stationary metal mold 48, the plunger is moved forward by oil pressure to inject the molten metal into the cavity between metal molds 48 and 49.

A projecting rod connected to a piston rod of the projecting cylinder 27 provided at the second station 3 moves freely through holes formed in the stationary board 16 and the mounting base 39 in and out from stationary metal mold 48. When the metal molds are opened, the projecting rod projects into the stationary metal mold 48 and ejects a solidified product from the stationary metal mold 48, so that the product is easily held in movable metal mold 49. An extrusion rod connected through an ejector plate 60 to a piston rod of the extrusion cylinder 28 freely moves into and out of the movable metal mold 49 and therefore can push the product from open movable metal mold 49. The product extracting unit 26 receives the extruded product and then pivots horizontally to extract the product from the die casting machine. In addition, third station 4 has a spray unit (not shown) for applying a mold release agent in the open metal molds 48 and 49.

OPERATION

A casting operation of the rotary die casting machine having the above arrangement will be described below with reference to the mold opening/closing unit 29 in accordance with a sequence of steps.

Once the mold opening/closing unit 29 which encloses metal molds 48 and 49 is mounted on the carrier 32 rolling on rails 31 of frame 30, cylinder 50 piston rods 51 move mold opening/closing unit 29 upward until the lower surface of mounting base 39 rises above the higher central portion 16a of the stationary board 16. At this time, the rotary table 14 is stopped so that a central axis of stationary board 16 coincides with the axis of frame 30. Therefore, when the carrier-moving cylinder 36 piston rods 37 are moved forward, while wheels 34 roll on rails 31 and 33 the carrier 32 under the mold opening/closing unit 29 moves forward onto stationary board 16. The U-shaped carrier 32 moves onto the lower portions 16b while it surrounds the higher central portion 16a from three directions, and is finally stopped against a stopper. Next, cylinder 50 piston rods 51 are moved downward to fix the mold opening/closing unit 29 so that the mounting base 39 seats on the higher central portion 16a. Since the lower surface of the mounting base 39 is now spaced from rollers 35 of the carrier 32, at this time the piston rods 37 are moved backward to transfer carrier 32 from stationary board 16 onto frame 30, and the next mold opening/closing unit 29 is mounted thereon. Mold opening/closing unit 29 metal molds 48 and 49 which are fixed on stationary board 16 open when piston rod 47 of the mold opening/closing cylinder 46 moves upward, and, when the rotary table 14 pivots through 120 degrees, reaches and stops at third station 4. The spray unit (not shown) then applies a mold release agent inside metal molds 48 and 49. Next, the mold opening/closing cylinder 46 piston rod 47 moves downward to close the metal molds. In this case, a minimum necessary mold clamping force is applied to metal molds 48 and 49.

After the metal molds are closed, table 14 rotates the closed mold opening/closing unit 29 through 120 degrees to a stop at first station 2. Then, oil is compressed into the upper portion of ram 53 to move platen 54 downward. Therefore, top frame 44 moves downward against the oil pressure of mold opening/closing cylinder 46 to clamp the mold with a powerful force. In this case, since mold opening/closing unit 29 base 39 is seated on stationary board 16, large mold clamping forces are supported through rotary table 14 on the strong base platen 5.

During mold clamping, molten metal is supplied to the injection sleeve 59 of the tilted injection cylinder 58, and the molten metal-charged injection cylinder stands upright to connect injection sleeve 59 to a "stationary" sleeve at the side of metal mold 48. Thereafter, injection cylinder 58 injects molten metal into the cavity between metal molds 48 and 49. While the molten metal solidifies and cools, compressed oil in the upper portion of the ram 53 is discharged to pull-back cylinders 55. The moving platen therefore moves upward and releases its urging on top frame 44. As a result, the large mold clamping force is released, while the minimum necessary mold clamping force set in the mold opening/closing cylinder 46 remains acting on the metal molds 48 and 49.

During cooling, table 14 rotates through 120 degrees, and stops the mold opening/closing unit 29 in which the product is cooling at second station 3. After metal molds 48 and 49 have cooled completely, the mold opening/closing cylinder 46 piston rod 47 is moved forward to raise top frame 44 upward, while at the same time the projecting cylinder 27 piston rod is moved forward. As a result, the solidified and cooled product is removed from metal mold 48 and held in, and moved upward with, the cavity of movable metal mold 49 together with top frame 44. When top frame 44 moves completely upward, the product extracting unit 26 (FIG. 1) moves its receiving tray forward to a central portion between metal molds 48 and 49, and the extrusion cylinder 28 piston rod moves forward the rod projecting through ejector plate 60 into the cavity. Hence, the product is discharged onto the receiving tray, and the receiving tray is moved backward from the machine to extract and stack the product.

The operation of casting one mold opening/closing unit 29 steps have been described in order. Through the above operation, each time other stationary boards 17 and 18 on rotary table 14 stop at second station 3, the mold opening/closing unit 29 is supplied to the stationary board in the manner described above, and the same operation is performed at stations 2, 3, and 4. Thereafter, table 14 is intermittently rotated through 120 degrees to start a normal casting cycle.

During normal casting operations, in order to extract the pair of metal molds 48 and 49 for maintenance or the like, the mold opening/closing unit 29 containing the metal molds 48 and 49 is moved backward onto the frame 30 by reciprocation of carrier 32 and vertical motion of the piston rods 51. Then, after table 14 rotates once, another mold opening/closing unit 29 is supplied while other two mold opening/closing units 29 carry on the normal casting operation. Therefore, except for replacement of the molds, productivity of the machine is not degraded. In order to replace all three mold opening/closing units because of changing product specifications, mold opening/closing unit 29 is removed/mounted three times at second station 3 each time the rotary table 14 rotates through 120 degrees. If meanwhile operations continue at stations 2 and 4, productivity is not as much degraded during metal mold replacement.

Although the above embodiment uses three workstations, the number of work stations may be two or four.

The present invention is applied not only to rotary die casting machines but in addition, in a second embodiment also to an apparatus in which two mold opening/closing units are moved in lateral directions from the right and left sides alternately into and out of a mold clamping/casting unit. That is, in a mold clamping/casting unit similar to first station 2 above, the stationary board 16 is formed on its base platen. Frame 30, carrier 32, and cylinders 36 are provided at each of the right and left sides of stationary board 16. The mold opening/closing units mounted on the carriers are alternately moved inward onto the stationary board for clamping and casting the mold. This second embodiment is described below with reference to FIGS. 5 to 9. Otherwise, a carrier may be formed long enough on which to mount two mold opening/closing units and alternately moved forward and backward so that the right and left mold opening/closing units are alternately moved forward into and seated on the stationary board, to clamp and cast the molds.

FIGS. 5 to 9 show the die casting apparatus according to the present invention in the second above-mentioned embodiment, in which a base platen 101 having a planar rectangular shape is installed on a floor surface foundation, and a mold clamping unit 102 is located at a central portion in a longitudinal direction of base platen 101. Mold clamping unit 102 includes a cylinder platen 105 supported by tie bars 103 extending upright from the four corners of base platen 101 and fixed by nuts 104. A mold clamping cylinder (not shown) for moving a moving platen 106 downward from an upper position shown in the drawings to clamp the mold is located at a central portion of the cylinder platen 105.

Figure 6:
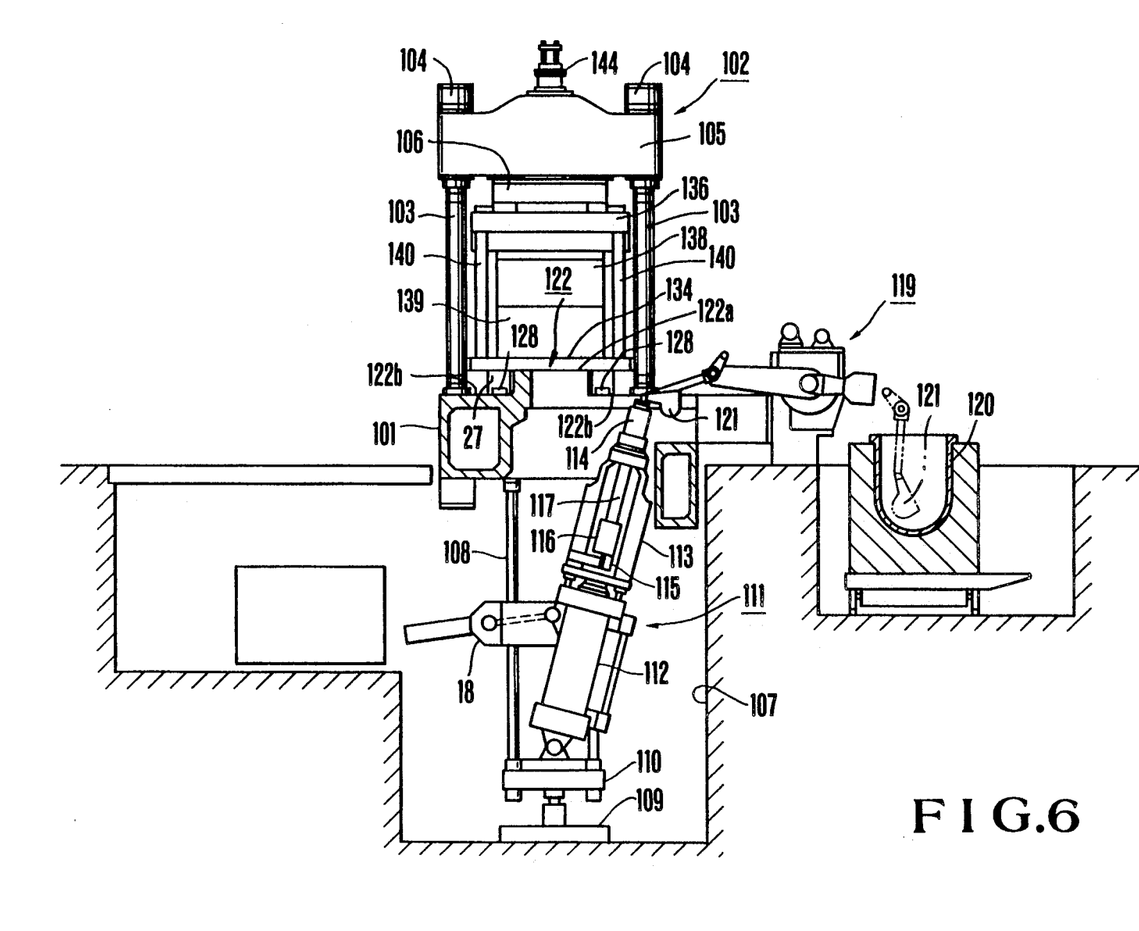
FIG. 6 is a side view of FIG. 5.
Figure 7:
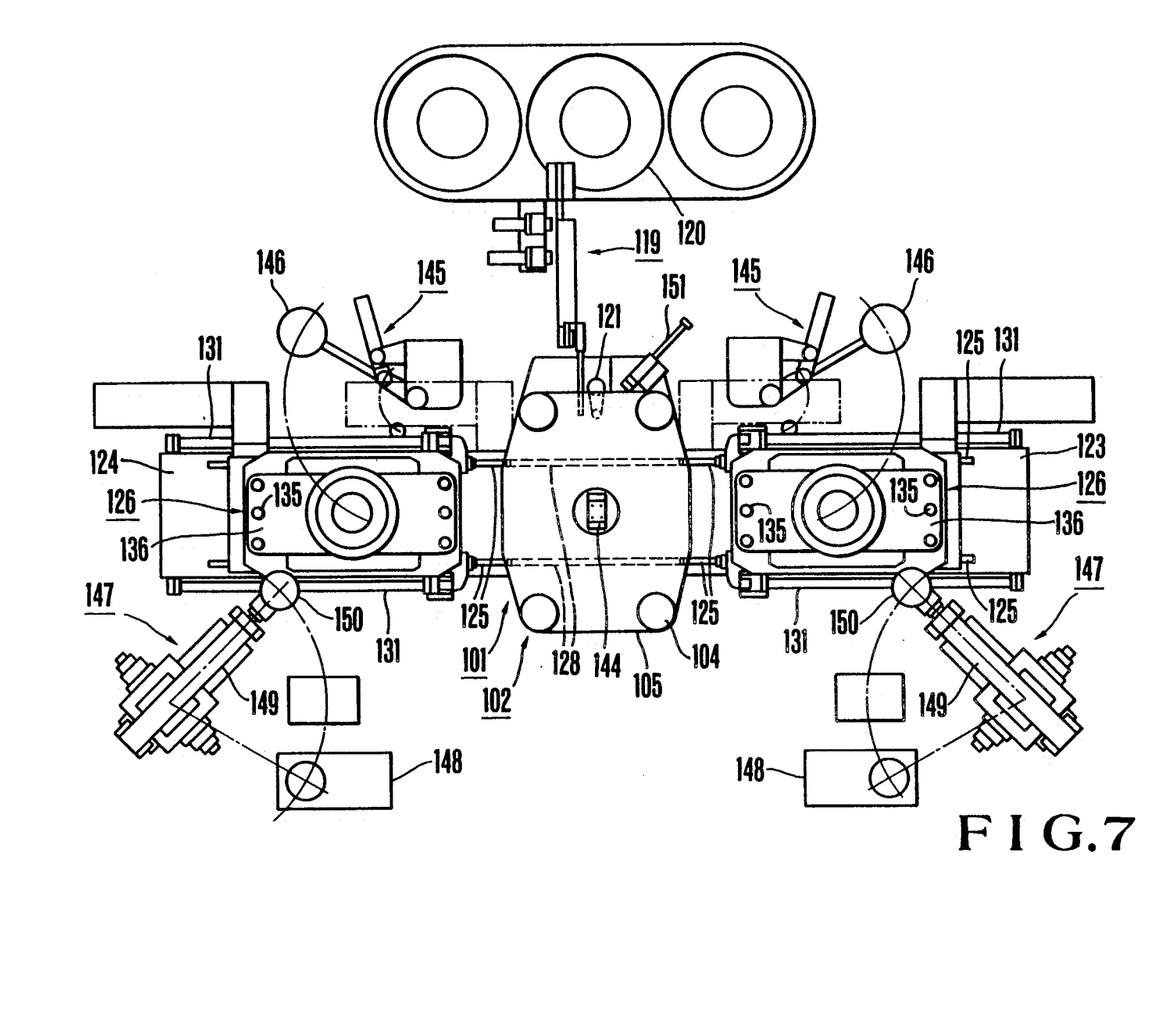
FIG. 7 is a plan view of FIG. 5.

A cylinder receiver 110 is fixed to a plurality of support bars 108 descending from base platen 101 into a pit 107 below the floor surface to a support base 109 fixed on the bottom of pit 107. An injection unit 111, supported by raisable cylinder receiver 110, comprises an injection cylinder 112 and a sleeve frame 113 fixed concentrically on the upper end face of injection cylinder 112. A plunger 117 tip is connected to a piston rod 115, which is moved by the pressure of oil from injection cylinder 112 forward/backward through a coupling 116 and is fitted into a hole inside injection sleeve 114 supported at the upper end of sleeve frame 113 so as to be moved freely forward and or backward. The entire injection unit 111 pivots by motion of the tilt cylinder 118 between an upright state and a tilt state shown in the drawings. While in the tilt state a molten metal is supplied, and while in the upright state the molten metal is injected. Referring to FIG. 6, molten metal is supplied by an automatic molten metal supply unit 119 arranged such that a ladle 121 is reciprocated between a melting furnace 120 in which a molten metal is received and the injection sleeve 114 at the tilt position so as to supply molten metal at a predetermined timing.

A stationary board 122 onto which a mold opening/closing unit 126 to be described later is integrally formed as a position at a central portion of the base platen 101 immediately below a mold clamping cylinder. Stationary board 122 has a high central portion 122a and lower portions 122b at either side of the higher central portion 122a, as shown in FIGS. 6 to 9, and therefore has a projecting sectional shape. Base platen 101 includes bases 123 and 124 which extend right and left from stationary board 122. Two rails or tracks 125 are installed on each of bases 123 and 124.

Figure 9:
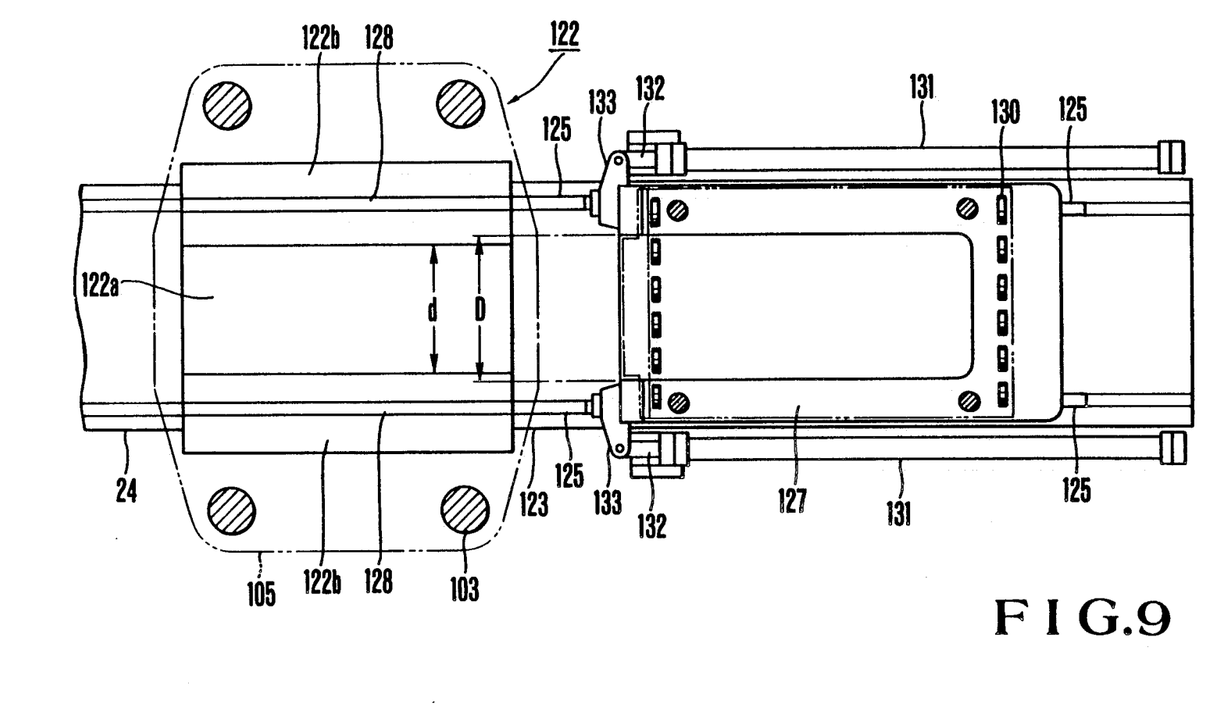
FIG. 9 is a plan view of a main portion shown in FIG. 8.

The mold opening/closing unit 126 and a unit for moving the mold opening/closing unit 126 in and out from the stationary board 122. A carrier 127 has four wheels 129 which roll on rails 125 and rails 128 installed on stationary board 122. The carriers 127 are provided on the right and left bases 123 and 124, respectively. Since right and left carriers 127 and the mold opening/closing units 126 mounted thereon have the same arrangements, respectively, only a pair at one side will be described. Carrier 127 includes an opening opposite from stationary board 122 and thus has a planar U shape. Opening width D in FIG. 9 is slightly larger than the opening d of the higher central portion 122a. Two rows of pluralities of rollers 130 are arranged rotatably on the carrier 127. Upper ends of the rollers 130, (over the upper surface of carrier 127) are formed lower by distance "t" (FIG. 8) than an upper surface of stationary board higher central portion 122a. A pair of carrier-moving cylinders 131 are supported on either side of base 123. Cylinder 131 piston rod 132 actuation ends are connected to metal pieces 133 which are fixed onto both sides of a front end portion of carrier 127. When piston rods 132 are moved forward/backward by, e.g., an air pressure, carrier 127 moves forward/backward between a position on the lower portions 122b where it surrounds higher central portion 122a from three directions, and alternately a position on base 123 as an external portion in a direction lateral from the stationary board 122.

The mold opening/closing unit 126 mounted on the carrier 127 has at its lower end portion a planar rectangular mounting base 134. From central portions of both short sides of mounting base 134 extend a pair of mold opening and closing cylinders 135 with proximal ends fixed to the mounting base 134. Top frame 136 has both ends fixed to actuation ends of piston rods 137 of mold opening/closing cylinders 135. A movable metal mold 138 and a stationary metal mold 139 are fixed to the top frame 136 and the mounting base 134, respectively. When top frame 136 is moved upward/downward by the mold opening/closing cylinder 135, the movable metal mold 138 opens and closes with respect to stationary metal mold 139. When top frame 136 is slightly further moved downward after the metal molds are closed, a minimum necessary mold clamping force is applied. Cylindrical guide pipes 140 extend from the mounting base 134 with their proximal ends fixed to the four corners of mounting base 134. The guide rod 141 upper ends are fitted into holes inside the guide pipes to move freely upward/downward and fixed to top frame 136 to guide upward and downward motion of top frame 136.

The mold opening/closing unit 126 having the above arrangement is supported by pistons at the carrier 127 side. Cylinders 142 are provided at four positions, i.e., the front and rear, right and left corners of carrier 127. Upper end half portions 143a of piston rods 143 are moved upward/downward by an air pressure or the like of the cylinders 142 and fixed to the mold opening/closing unit so that upward/downward motion of the top frame 136 is guided by guide pipes 140. The upper end half portions 143a of piston rods 143 which are moved upward/downward by an air pressure or the like from the cylinders 142 fit into pin holes 134a in the mounting base 134, to position mold opening/closing unit 126. Step portions (upper end halves) 143a support and define downward and horizontal motions of mold opening/closing unit 126. When piston rods 143 move upward/downward, mounting base 134 moves upward/downward so that its lower surface is moved between positions higher and lower than the upper surface of stationary board higher central portion 122a. At the higher position of this lower surface, mounting base 134 moves onto the stationary board 122 without contacting the upper surface of the higher central portion 122a. At the lower position, this surface seats on the lower portions 122b. When piston rods 143 are further moved downward while the carrier 127 is located on the base 123, mold opening/closing unit 126 seats on rollers 130 and thus can be easily removed from carrier 126 for maintenance or the like.

An extrusion cylinder 144 fixed on an upper end portion of the mold clamping unit 102 extrudes a product from the open movable metal mold 138 in the mold clamping unit 102. Metal mold spray units 145 are provided for the right and left bases 123 and 124. Each metal mold spray unit 145 includes a spray pot 146 capable of moving towards a central portion of the mold opening/closing unit 126 extracted onto the base 123 or 124 and of applying a mold release agent in the opened cavity of the metal molds 138 and 139. Product extracting units 147, provided for the right and left bases 123 and 124, each include a cylinder 149 capable of pivoting between a product extracting position and a product stacking position 148. At the cylinder 149 side, a chuck 150 is moved at the product-extracting side into the open metal molds 138 and 139 to extract a product. A spray unit 151 is provided to the injection unit 111 for applying a mold release agent to injection sleeve 114.

An operation of the die casting apparatus having the above arrangement will be described below. Before starting casting, carriers 127 are stopped on rails 125 of bases 123 and 124 while they are supported by piston rods 132 of carrier moving cylinders 131. The mold opening/closing unit 126 is supported on each carrier 127 such that, by the piston rods 143 which are moved upward, it floats from roller 130. Dies 138 and 139 are mounted in each mold opening/closing unit 126. When the mold opening/closing cylinders 135 of one of the mold opening/closing units 126 are operated to move their piston rods 137 forward or upward, the top frame 136 moves upward while being guided by the guide pipes 140, thereby opening the metal molds. Thereafter, a mold release agent is applied to the cavity of metal molds 138 and 139 by metal mold spray unit 145 shown in FIG. 7, and piston rods 137 are moved backward or downward to close the metal molds. Then, the piston rods 137 are further slightly moved backward or downward to apply a minimum necessary mold clamping force.

Then, the piston rods 132 of the carrier moving cylinders 131 are moved forward, carrier 127 moves forward while wheels 129 roll on rails 125 and 128 and stops at the central portion of stationary board 122. Since the carrier 127 opening width D is wider than the stationary board higher central portion 122a width "d" shown in FIG. 9, carrier 127 easily moves forward while it surrounds the higher central portion 122a. While the carrier 127 moves forward, the head-end sides of cylinders 142 are connected to a pump, and their rod-end sides are connected to a tank. However, after the forward movement of the carrier is completed, the head-end sides are also connected to the tank by switching solenoid valves. Thus, the entire mold opening/closing unit 126 is moved downward and seats mounting base 134 on higher central portion 122a. Then, when the mold clamping cylinder moves platen 106 downward, top frame 136 descends against a pressure of the mold opening/closing cylinders, and finally clamps the metal molds 138 and 139. In this case, the mold clamping force acts on the stationary board 122, i.e., the strong base platen 101, but does not act on carrier 127 because a gap t is formed therebetween. While the mold is clamped, tilt cylinder 118 tilts the entire injection unit 111 and the automatic molten metal supply unit supplies molten metal to injection sleeve 114, and the injection cylinder rises. Injection sleeve 114 is then engaged with a sleeve hole of stationary metal mold 139, and plunger 117 is moved forward to inject the molten metal into the cavity of metal molds 138 and 139.

After the injected molten metal has solidified and cooled, mold clamping by the mold clamping cylinder is released, and the head-end sides of cylinder 142 are switched to the pump. Therefore, mold opening/closing unit 126 is moved upward and mounting base 134 is moved apart from the higher central portion 122a. Therefore, when the piston rods 132 of the carrier moving cylinders 131 are moved backward, carrier 127 having mold opening/closing unit 126 thereon is moved backward onto base 123. During mold clamping and injection, in the same manner as described above a mold release agent is applied in the metal molds 138 and 139 of the mold opening/closing unit 126 mounted on the carrier 127 located on the other base 124. The carrier 127 on the base 124 is moved forward to the mold clamping position while carrier 127 at the base 123 side is moved backward onto base 123. The metal molds 138 and 139 closed in the mold opening/closing unit 126 on the carrier 127 on the base 123 are opened by mold opening/closing cylinders 140. A product held in the movable metal mold 138 is then extruded to a chuck of the product extracting unit 147 which is pushed to a central portion of the metal molds 138 and 139, removed from the metal mold by the cylinder 149, and stacked on the stacking portion 148.

While the product is being extracted, the metal molds 138 and 139 of the (other) mold opening/closing unit 126 currently at the mold clamping position are clamped and molten metal is injected. During mold clamping and injection, a mold release agent is applied in other metal molds 138 and 139, and the above operation is repeated to alternately perform casting to the right and left mold opening/closing units 126. In order to exchange the metal molds 138 and 139 or to perform maintenance thereof, the rod-end sides of cylinders 142 are switched to the pump, and their head-end sides are switched to the tank. Therefore, the piston rods 43 are moved backward, and the mold opening/closing unit 126 is moved downward until the mounting base 134 seats on rollers 130. After mounting base 134 has seated on wheels 130, the mold opening/closing unit 126 can be easily moved on the rollers 130 and removed from the carrier 127 either manually or using an extracting tool (not shown).

Note that the right and left carriers 127 may be moved in and out from the mold clamping portion either at different timings or in synchronism with each other, such that while one carrier is being moved into the mold clamping unit, the other one is being removed. In addition, even when an operation is temporarily stopped while the metal molds of one mold opening/closing unit 126 are being replaced or the mold opening/closing unit 126 is malfunctioning and in need of repair, casting can be continued using the other mold opening/closing unit.

As described above, in the die casting apparatus according to the present invention, carriers having the mold opening/closing units thereon are located at right and left sides of the vertical mold clamping unit, respectively, and independently moved in/out from the vertical mold clamping unit. Therefore, when casting of one of the mold clamping/closing units is temporarily interrupted for mold replacement or maintenance, casting of the other mold opening/closing unit can be continued, thereby maintaining productivity.

What is claimed is:

1. A multi station die casting apparatus (1) of the type including
    a mold clamping unit (10);
    at least one mold opening/closing unit (29);
    at least one mold means including a stationary mold (48) and a movable mold (49) disposed in a respective opening/closing unit; and
    at least one carrier (32) supporting and movable with a respective mold opening/closing unit back and forth between a predetermined position inside of, and a standby position outside of, said mold clamping unit; wherein at least one of said stations includes
    a stationary board (16) having a high portion (16a) disposed at said predetermined position; and
    a pair of tracks (31) straddling said high portion, for guiding said at least one carrier between said standby position and said predetermined position; and wherein each said carrier (32) includes
    lower means (34) for moving freely on said tracks,
    upper means (35) for on-loading said mold opening/closing unit, and
    lift means (50,51) for
        raising said opening/closing unit to an elevation higher than said high portion above said carrier when in said standby position,
        holding said opening/closing unit at said elevation while being moved by said carrier along said tracks into said predetermined position, and
        lowering said opening/closing unit onto said high portion in said predetermined position.

2. An apparatus according to claim 1 wherein said lift means comprises at least two pairs of pistons (51) and cylinders (50).

3. An apparatus according to claim 2 wherein said lift means comprises four pairs of pistons and cylinders disposed vertically at respective front and rear right and left corners of said carriers.

4. An apparatus according to claim 2 wherein said cylinders are fixed to said at least one carriers.

5. An apparatus according to claim 4 wherein each said opening/closing unit has a base (39) with an underside having four holes, and wherein each said piston comprises a rod having an upper end which is split into a semicircular projecting portion fitting into a respective one of said holes, and a semicircular step portion, not fitting into said hole, which defines vertical positions of said base.

6. An apparatus according to claim 1 wherein said carriers each have a planar C or U shape with an opening opposing said stationary board to surround said high portion on three sides.

7. An apparatus according to claim 1 wherein said mold clamping unit is a vertical mold clamping unit.

8. An apparatus according to claim 7 wherein said carriers are independently located at either side of said clamping unit and can be moved separately into and out of said predetermined position.

9. An apparatus according to claim 7 and further comprising a rotary table (14) having a station where said vertical mold clamping unit is disposed.

10. An apparatus according to claim 1 wherein each said carrier comprises a plurality of rollers (35) for supporting and moving said mold opening/closing unit laterally from said carrier outside and mold clamping unit after said lift means has lowered said mold opening/closing unit downward.

* * * * *